Jan. 3, 1967   D. R. TALBOTT   3,295,231
APPARATUS FOR REMOVING MATTER, PARTICULARLY WEED
GROWTH FROM THE BOTTOM OF WATERWAYS
Filed July 7, 1964
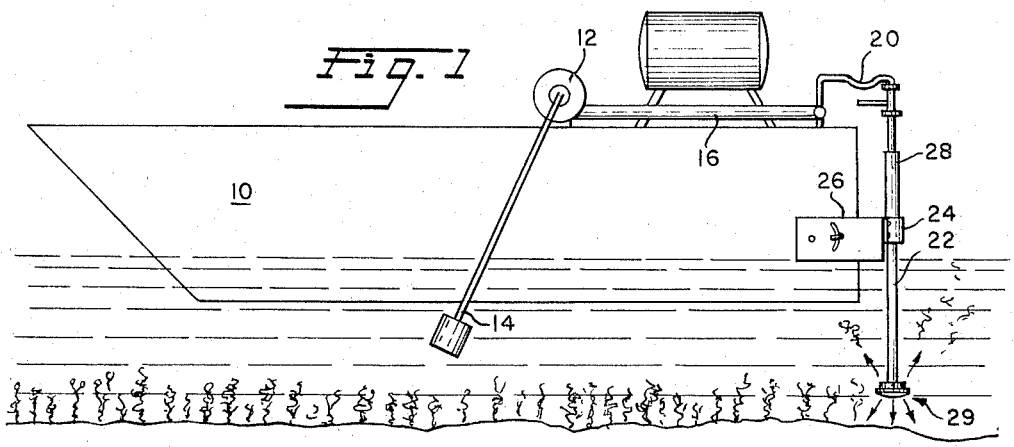
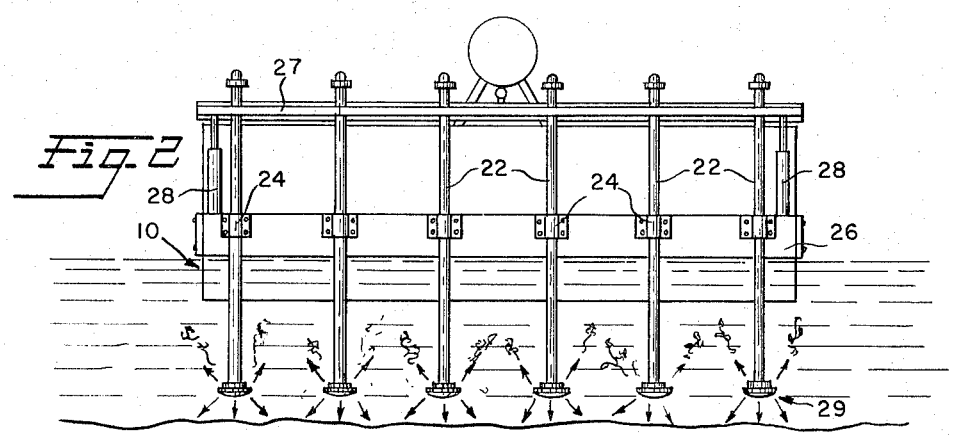
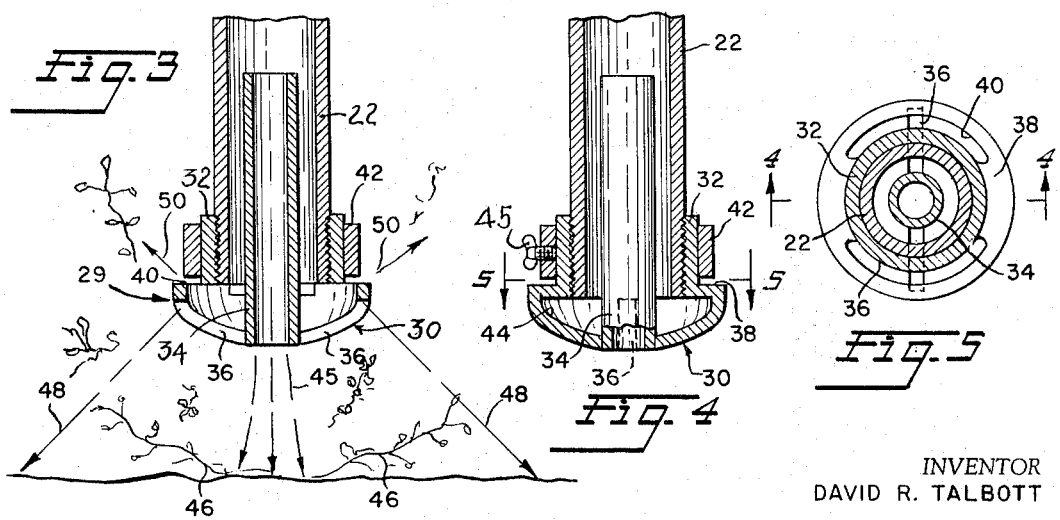
INVENTOR
DAVID R. TALBOTT
BY
*Scrivener, Parker, Scrivener & Clarke*
ATTORNEYS United States Patent Office 3,295,231
Patented Jan. 3, 1967

3,295,231
APPARATUS FOR REMOVING MATTER, PARTICULARLY WEED GROWTH FROM THE BOTTOM OF WATERWAYS
David Russell Talbott, 224 Westwood Road, Annapolis, Md. 21401
Filed July 7, 1964, Ser. No. 380,844
7 Claims. (Cl. 37—78)

This invention relates to apparatus for removing aquatic growth from the bottom of water ways and more particularly to apparatus which removes sea weed and other vegetation by the use of hydro jets.

The present invention is an extension in the field of sea weed removal beyond that disclosed in the prior patents to Talbott and Darden, Nos. 2,852,868 and 3,019,535. These patents and the present invention are concerned primarily, though not exclusively, with the total removal of sea weed of the type which infests and renders unusable tidal shore line areas in various parts of the United States, for example, in the tributaries of the Chesapeake Bay. The present invention has in common with the two earlier patents an arrangement whereby the entire sea weed plant including the roots is dislodged by hydro jet action from the bottom of the water way. This is the unique contribution of the patents and the present application over the universally used system of running a mower-like implement through the weed bed which merely clips the top of the weed and leaves the root behind for regrowth after a relatively short period of time. With the patented systems and the system of the present invention once the weed has been removed there can be no further weed growth in the treated area until the area has been reinfested with weed spores from outside the area during the early spring of the following year.

The patented systems rely on a plurality of downwardly and rearwardly projecting jet pipes which project a high velocity jet stream at the base of the weeds so that the roots are washed free and the jets also serve to propel the apparatus forwardly. Though the system works with great effectiveness, in certain areas having a particular class of bottom material, it has been found that after the weeds have been jetted free and pushed rearwardly by the jet stream, continued jetting action also propels rearwardly a sufficient quantity of bottom material to overlay some of the weed before it floats to the top resulting in incomplete weed removal.

The object of the present invention is to provide a jet arrangement which positively overcomes the foregoing problem. Extensive experiments have established that in certain areas jet propulsion can be sacrificed in favor of a jet arrangement which does a more thorough job of weed removal than would be possible in these same areas using the apparatus of the earlier patents.

More particularly it is an object of the invention to provide aquatic weed removal apparatus of the hydro-jet variety wherein a combination of jet streams operates simultaneously on the weeds to dislodge the weed and thereafter propel the weeds toward the surface of the water.

Other objects and their attendant advantages will become apparent as the following detailed description is read in conjunction with the accompanying drawings wherein:

FIG. 1 is a somewhat schematic vertical side elevational view of apparatus incorporating the present invention;

FIG. 2 is a vertical rear elevational view of the apparatus of FIG. 1;

FIG. 3 is an enlarged, broken vertical cross-sectional view of a jet arrangement constructed in accordance with the present invention;

FIG. 4 is a vertical side-elevational view taken substantially on the line 4—4 of FIG. 5; and FIG. 5 is a horizontal cross-sectional view taken substantially on the line 5—5 of FIG. 4.

Referring now to the drawings, the numeral 10 designates a shallow draft barge of conventional construction and carried on the barge is a centrifugal pump 12 supplied with water from a trailing intake line 14. The pump 12 delivers water at a substantially high pressure rearwardly through a line 16 to an athwartship manifold having connected thereto at spaced intervals a plurality of flexible conduits 20 connected respectively to vertically arranged pipes 22 which are slidably and mutually supported in bearings 24 fixed in any convenient manner to a relatively stationary frame member 26 connected to the rear of the barge as shown. As described in the aforementioned Patent No. 3,019,537, to which reference is made, all of the jet pipes 22 are desirably connected together by athwartship frame members 27 which may be raised or lowered through the medium of hydraulic motors 28 at opposite sides of the barge as shown.

In accordance with the invention each of the vertical jet pipes 22 terminates at its lower end in a jet nozzle arrangement 29 having characteristics found particularly suited to the removal of sea weed. As shown each nozzle 29 includes part-spherical end members 30 each having an integral, upstanding, internally threaded neck-part 32 adapted to be received on external threads at the lower end of each of the jet pipes 22.

The end member 30 is centrally apertured to receive a relatively short pipe 34 which is of substantially less diameter than the jet pipe 22 and extends co-axially into the pipe as clearly shown in FIGS. 3 and 4. As can be best seen in FIGS. 3 and 5, the end part 30 is slotted at 36 on opposite sides of the central pipe 34 with the slots 36 lying in a transverse vertical plane parallel to the rear of the barge.

The external diameter of the neck part 32 of the nozzle member of the invention is substantially less than the external diameter of the end part 30 to provide a horizontal shoulder 38 which is provided with a pair of horizontal, oppositely disposed arcuate slots 40 symmetrically arranged with respect to the lower slots 36. Slidably received on the neck 32 of the nozzle member is a collar 42 whose outer diameter is somewhat greater than the outer diameter of the horizontal slots 40 whereby the collar when in its lowermost position entirely closes off the horizontal slots. As the collar is moved upwardly away from the slots a greater quantity of water is deflected off the part-spherical inner surface 44 of the end member to stream upwardly through horizontal slots for purposes that will become apparent. The collar may be retained in its selected position by means of the butterfly screw 45 shown, or by a set screw.

In use, the jet pipes are first positioned vertically so that the nozzles 29 are disposed a few inches above the bottom of the water way, the pump 12 is started and the barge is propelled forwardly in any of a variety of ways, as by poling. As water flows through the pipes 22 at relatively high pressure and velocity, a central high-powered jet stream indicated by the arrows 45 is projected substantially vertically downwardly against the base of sea weed, indicated at 46 in FIG. 3, which is bent outwardly or parted by sheet or fanlike jets emanating from the lateral slots 36 as indicated by the arrows 48. In addition to parting the weeds to expose the bases thereof to the strong central jet, the fan shaped jets also effect dislodgment of a large portion of weed not subjected directly to the vertical jet. As the weed is dislodged through jet action it commences to float towards the surface and as soon as it is free of the influence of the fanlike jets the weed is caught in the upwardly flowing swirl produced by the upwardly directed jet streams, indicated by the arrows 50, emanating from the horizontal slots 40 in the shoulders 38. Thus the weed, almost immediately after it has been freed, is propelled rapidly towards the surface before it can be covered or anchored by mud or sand stirred up by the downwardly projected jet stream.

Depending upon conditions such as growth density and character of the bottom, the collar 42 may be positioned upwardly or downwardly to adjust the capacity of the horizontal slots 40. Under certain conditions, an upwardly projected stream may be unnecessary whereupon the collar is positioned in its full down position to close off the ports 40. At other times it may be desirable to have a strong upwardly directed stream whereupon the collar would be positioned vertically well above the shoulder 38 so that water flowing upwardly through the horizontal solts 40 is substantially unimpeded.

In experimental operations, the nozzle of the invention has been found to be extremely effective and in selected areas has totally removed all of the weed in the area for an entire season. It will of course be apparent to those skilled in the art that the nozzle of the invention is susceptible of a variety of changes and modifications without, however, departing from the scope and spirit of the appended claims.

What is claimed is:

1. In combination with a substantially vertical pipe, a nozzle member connected to the lower end of said pipe and comprising a part spherical, hollow, downwardly projecting body member having an outer diameter substantially greater than the diameter of said pipe, a neck part on the upper side of the part-spherical member in fluid type engagement with the lower end of said pipe and serving to communicate said pipe with the interior of said body member, a horizontal shoulder part interconnecting the lower end of said neck part and the upper end of the part-spherical body member, openings through said shoulder, a relatively short pipe section of less diameter than said vertical pipe and having an upper end extending co-axially into said pipe and having a lower end extending through the lower side of said part-spherical member, and central slot means through the lower side of said spherical member on opposite sides of the lower end of said pipe section.

2. The combination of claim 1 including a collar slidably received on said neck part and including a lower end part adapted to engage said shoulder and close off the openings therethrough, and means for releasably locking said collar in a selected position with respect to said neck part.

3. In combination with a substantially vertical pipe having an upper end adapted to be connected to a source of fluid pressure, a nozzle member at the lower end of said pipe, said nozzle member including a hollow body in open communication with said vertical pipe and having a substantially closed bottom wall, a relatively short pipe section of less diameter than said vertical pipe and having a lower end projecting through the bottom wall of said hollow body and extending co-axially upwardly in said vertical pipe beyond said body, and a straight slot through the bottom wall of said body and extending symmetrically on opposite sides of the lower end of said pipe section.

4. In combination with a substantially vertical pipe having an upper end adapted to be connected to a source of fluid pressure, a nozzle member at the lower end of said pipe, said nozzle member including a hollow body in open communication with said vertical pipe and having a substantially closed bottom wall, a relatively short pipe section of less diameter than said vertical pipe and having a lower end projecting through the bottom wall of said hollow body and extending co-axially upwardly in said vertical pipe beyond said body, and fluid ports in the upper side of said body arranged to project fluid delivered through said pipe to said body upwardly simultaneously with the delivery of fluid downwardly through said pipe section.

5. The combination of claim 4 including means for adjusting the capacity of said upwardly directed ports.

6. In combination, a shallow draft barge, a plurality of substantially vertical, laterally spaced pipes extending downwardly from one end of said barge, pump means carried by said barge and having a fluid connection with said pipes for delivering fluid under pressure simultaneously to all of said pipes, a nozzle member at the lower end of each of said pipes, said nozzle member including a hollow body in open communication with the respective pipes and having a substantially closed arcuate bottom wall, a relatively short pipe section of less diameter than said vertical pipe and having a lower end projecting through said bottom wall of said hollow body and extending co-axially upwardly into said vertical pipe beyond said hollow body, a straight transverse slot through the bottom wall of said hollow body and extending symmetrically on opposite sides of the lower end of said pipe section, the slots of the respective nozzle members lying in a vertical plane parallel to the end of the barge, and upwardly directed fluid ports through each of said bodies for directing fluid delivered through said pipes to said bodies in an upward direction simultaneously with the delivery of fluid downwardly through said pipe sections and said transverse slots.

7. The combination of claim 6 including means for adjusting the capacity of said upwardly directed fluid ports.

References Cited by the Examiner

UNITED STATES PATENTS

| 623,335 | 4/1899 | Pinkham | 37—63 |
| 1,809,787 | 6/1931 | McLaren | 239—291 X |
| 2,320,964 | 6/1943 | Yates | 239—291 |
| 2,501,411 | 3/1950 | Ryan | 37—78 X |
| 3,117,726 | 1/1964 | Schoberg | 239—291 |

FOREIGN PATENTS 512,785    11/1930    Germany.

ABRAHAM G. STONE, *Primary Examiner.*

R. L. HOLLISTER, *Assistant Examiner.*